Figure 1:
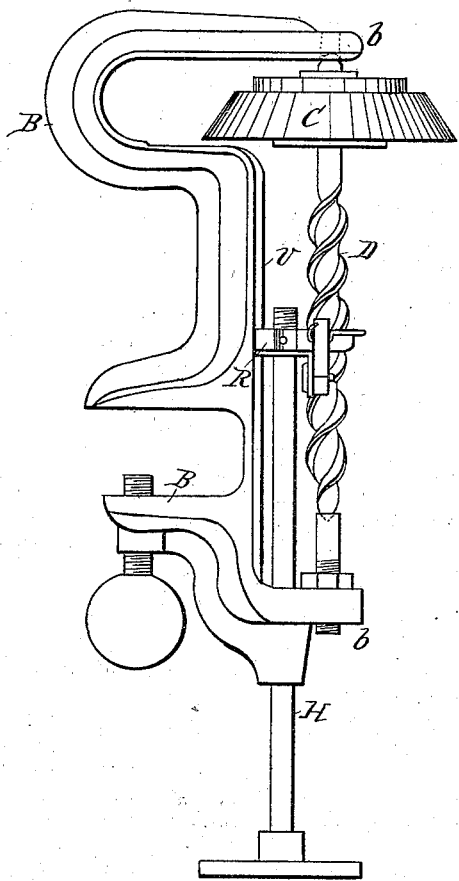
Figure 2:
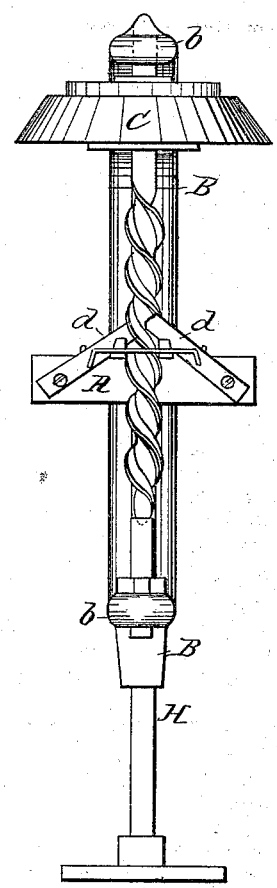

E. P. CLARK.
Mechanical Movements.

No. 147,822. Patented Feb. 24, 1874.

Witnesses.

Inventor.

UNITED STATES PATENT OFFICE.

EDSON P. CLARK, OF NORTHAMPTON, MASSACHUSETTS.

IMPROVEMENT IN MECHANICAL MOVEMENTS.

Specification forming part of Letters Patent No. 147,822, dated February 24, 1874; application filed December 13, 1873.

*To all whom it may concern:*

Be it known that I, EDSON P. CLARK, of Northampton, Hampshire county, State of Massachusetts, have invented an Improved Device for Imparting a Rotary Motion to a Spindle and anything contained thereon, of which the following is a specification:

The nature of my invention consists in the employment of a screw running upon pivots or anti-friction bearings, to which a circular motion is communicated by one or more movable pawls engaging therewith, and connected to a plunger or sliding rod moving upon a track parallel to the axis of the screw; the object of my invention being to enable great speed to be quickly given to a grinding or polishing wheel upon the screw, or to a drill forming a prolongation of it, or to other connections thereto where such speed may be desirable.

In the drawings, Figures I and II show different views of my device.

In the frame B is hung the screw D, at $b\ b$, and the plunger H is free to move back and forth parallel to the screw, its head being guided upon the track $v$, and motion being imparted to it by the hand through the handle upon the outside of the frame or by means of a treadle. Upon the cross-head R is hinged one or more pawls, $d\ d$, which, when the plunger moves in one direction, engage with the blade of the screw and impart motion thereto, but when moving in the reverse direction pass without friction over the thread or blades, and by this means enable a continuous motion to be given to the screw, and, by reason of the pawls always acting against the screw when the plunger moves in one direction, (no matter at what speed the screw may already be moving at the time,) a constant acceleration of speed is produced, and the high rate obtained so necessary in polishing and grinding. The screw may be prolonged beyond the frame to afford a socket for various-sized drills, and the wheel C may be attached within the frame, as illustrated in the drawings. As a modification of the same principle, a right-and-left-hand screw may be joined, so that the plunger provided with a double set of pawls may have its reverse motion utilized, the pawls acting in both cases to accelerate the motion of the screw.

I am aware that a drill is constructed of right and left screws joined and operated by a nut; but in this case the speed of the drill is governed by the movement given to the nut, and cannot be increased except in direct ratio with the increased speed of the operating-nut; nor can the direction of the revolution of the screw be maintained, as each change of direction of the nut works a reversal of the screw.

Now, having described my invention, what I claim is—

In combination with the screw D, the movable pawl or pawls $d\ d$, substantially as shown and described.

EDSON P. CLARK.

Witnesses:
E. KINGSLEY,
O. A. SNOW.